United States Patent [19]

Kubo et al.

[11] 4,298,386
[45] Nov. 3, 1981

[54] CALCIUM SILICATE AND PROCESS FOR PRODUCING SAME

[75] Inventors: Kazuhiko Kubo, Gifu; Akira Takahashi, Kagamihara; Kenichi Oohashi, Mitaka, all of Japan

[73] Assignee: Kabushiki Kaisha Osaka Packing Seizosho, Osaka, Japan

[21] Appl. No.: 76,442

[22] Filed: Sep. 17, 1979

[30] Foreign Application Priority Data

Feb. 9, 1979 [JP] Japan ................... 54-14567

[51] Int. Cl.$^3$ ................... C01B 33/24; C04B 21/00
[52] U.S. Cl. ................... 501/80; 106/120; 423/331; 801/154
[58] Field of Search ............. 106/120, 40 R; 423/331

[56] References Cited

U.S. PATENT DOCUMENTS

| 3,501,324 | 3/1970 | Kubo | 423/331 |
| 3,679,446 | 7/1972 | Kubo | 106/120 |
| 3,988,419 | 10/1976 | Mori | 423/331 |
| 4,162,924 | 7/1979 | Kubo et al. | 106/120 |

*Primary Examiner*—Earl C. Thomas
*Assistant Examiner*—Mark Bell
*Attorney, Agent, or Firm*—Armstrong, Nikaido, Marmelstein & Kubovcik

[57] ABSTRACT

Globular secondary particles of wollastonite group calcium silicate crystals represented by the formula $$lCaO \cdot mSiO_2 \cdot nH_2O$$

wherein $1 \leq l \leq 6$, $1 \leq m \leq 6$ and $0 \leq n \leq 1$, characterized in that the particles comprise hollow globular secondary particles of the wollastonite group calcium silicate crystals, the globular secondary particles having an average spontaneous sedimentation height of at least 800 ml, an outside diameter of 5 to 110 μm, an average apparent density of 0.04 to 0.09 g/cm$^3$ and an average shell density defined by the equation $$Y = 0.0033X + B$$

wherein Y is the average shell density, X is the average diameter of the particles, B is a constant, $15 \mu m \leq X \leq 40 \mu m$ and $0 \leq B \leq 0.115$.

25 Claims, 7 Drawing Figures

CALCIUM SILICATE AND PROCESS FOR PRODUCING SAME

This invention relates to calcium silicate and a process for producing the same, and more particularly to secondary particles of calcium silicate crystals, aqueous slurries of calcium silicate crystals containing such secondary particles as dispersed in water, calcium silicate shaped bodies composed of such secondary particles and processes for producing these secondary particles, slurries and shaped bodies.

It is well known that calcium silicate shaped bodies have the features of being light and strong and having outstanding resistance to fire and good heat insulating properties. These characteristics appear attributable largely to the structure of the bodies and the method of production thereof.

We have already conducted extensive research on calcium silicate shaped bodies and processes for producing the same. In the course of the research, we found that calcium silicate crystals, when agglomerated into globular secondary particles of unique structure, afford shaped bodies having a low bulk density and high mechanical strength. Based on this novel finding, we accomplished an invention which has already been patented (U.S. Pat. No. 3,679,446).

The globular secondary particles of calcium silicate disclosed in the patent are substantially globular, are composed of needlelike crystals of calcium silicate interlocked with one another three-dimensionally, range from 10 to 150 μm in outside diameter and have needlelike to platelike calcium silicate crystals partly projecting from the surface in the form of whiskers. The secondary particles give calcium silicate shaped bodies having a low bulk density and high mechanical strength.

It is also well known that the heat insulating properties of calcium silicate shaped bodies improve with a decrease in the bulk density of the body. Thus efforts have been focused on the development of shaped bodies having a minimized density and nevertheless possessing useful strength.

An object of this invention is to provide calcium silicate shaped bodies having useful strength and a greatly reduced weight (i.e. a low bulk density).

Another object of this invention is to provide a process for producing exceedingly light shaped bodies of calcium silicate having useful strength.

Another object of the invention is to provide globular secondary particles of calcium silicate capable of affording calcium silicate shaped bodies having useful strength and yet possessing a greatly reduced weight.

Another object of the invention is to provide aqueous slurries of globular secondary particles of calcium silicate which can be used directly for the production of such shaped bodies of calcium silicate.

These objects and other features of the invention will become apparent from the following description.

Stated more specifically, the present invention provides globular secondary particles of calcium silicate characterized in that the particles are hollow globular secondary particles of wollastonite group calcium silicate crystals represented by the formula

wherein $1 \leq l \leq 6$, $1 \leq m \leq 6$ and $0 \leq n \leq 1$, the globular secondary particles having an average spontaneous sedimentation height of at least 800 ml, an outside diameter of 5 to 110 μm an average apparent density of 0.04 to 0.09 g/cm³ and an average shell density defined by the equation $$Y = 0.0033X + B$$

wherein Y is the average shell density, X is the average diameter of the particles, B is a constant, $15 \ \mu m \leq X \leq 40 \ \mu m$ and $0 \leq B \leq 0.115$.

Put in greater detail, the secondary particles of calcium silicate crystals of this invention have the following characteristics.

(1) The calcium silicate crystals are wollanstonite group crystals represented by the following formula as determined by a thermobalance and chemical analysis.

wherein $1 \leq l \leq 6$, $1 \leq m \leq 6$ and $0 \leq n \leq 1$. Typical of the wollastonite group calcium silicate crystals represented by the above formula are β-wollastonite (CaO.SiO₂), xonotlite (5CaO.5SiO₂.H₂O or 6CaO.6SiO₂.H₂O) and foshagite (4CaO.3SiO₂.H₂O). For use in this invention, xonotlite may contain a small amount of quasi-crystalline xonotlite which differs from xonotlite in crystallinity. Quasi-crystalline xonotlite grows into crystals of xonotlite and contains varying amounts of crystal water. Of the wollastonite group crystals exemplified above, wollastonite and xonotlite have the most preferred properties. Xonotlite as defined by the foregoing formula has good properties if l and m are each at least 2 and n is not larger than 1.

Insofar as the secondary particles of this invention comprise calcium silicate crystals of wollastonite group as the main component (usually in a proportion of at least 50% by weight), the particles may contain other calcium silicate crystals, such as tobermorite group calcium silicate crystals.

(2) The secondary particles of this invention have an average spontaneous sedimentation height of at least 800 ml, preferably at least 850 ml.

The average spontaneous sedimentation height is measured by the following method and shows the settling properties of the secondary particles when the particles are dispersed in water and then allowed to stand.

Secondary particles of calcium silicate crystals are dispersed in water to a concentration of 1% by weight to prepare an aqueous slurry of crystals. A 1000-ml portion of the slurry is placed into a 1000-ml measuring cylinder having an inside diameter of 6.5 cm, and the cylinder is shaken up and down 5 times with its open end closed with a cover. The slurry is then allowed to stand for 30 minutes with the cover removed, and the volume of the resulting sediment of the secondary particles is measured. The same procedure is repeated 5 times. The average spontaneous sedimentation height is the average of the five measurements in ml. An average spontaneous sedimentation height of 800 ml, for example, means that the cylinder contains a 200-ml upper layer of water only and a 800 ml of a suspension of the secondary particles in water in its lower portion.

(3) The secondary particles of this invention are composed of needlelike calcium silicate crystals which are three-dimensionally interlocked with one another and each in the form of a hollow globe having an outside diameter of 5 to 110 μm. For example, FIG. 1 which is an optical micrograph at a magnification of 200× showing secondary particles of Example 1 of the invention reveals that the particles are in the range of 5 to 110 μm in outside diameter and that most of the particles are in the range of 10 to 50 μm. Further from the photograph of FIG. 2 taken by a scanning electron microscope at a magnification of 600× and showing secondary particles of Example 1 of the invention, it is seen that the secondary particles are formed of numerous calcium silicate crystals which are three-dimensionally interlocked with one another and have a hollow interior. FIGS. 3 and 4 are scanning electron micrographs at magnifications of 600× and 2000×, respectively, showing a slice of about 1.5 μm in thickness of a shaped body obtained by subjecting the aqueous slurry of secondary particles of Example 1 of the invention to spontaneous sedimentation to form a mass and drying the resulting mass. The slice was prepared by cutting off a portion of the shaped body, fixing the portion with a mixture of methyl methacrylate, ethyl methacrylate and n-butyl methacrylate resins and slicing the fixed portion with a super microtome. FIGS. 3 and 4 indicate that the secondary particles are in the form of hollow globes made up of three-dimensionally interlocked crystals of calcium silicate.

(4) The secondary particles of the invention have an average apparent density of 0.04 to 0.09 g/cm$^3$ as determined by the following method.

Secondary particles of the invention are dispersed in water to prepare a slurry of calcium silicate crystals. One part by weight of a nonionic surfactant ("FC-430," trademark for a surfactant consisting mainly of fluorocarbon and manufactured by Sumitomo 3M Co., Ltd., effective component 100%) is uniformly admixed with the slurry per 100 parts by weight of the slurry. A 200 g quantity of the mixture is then placed into a mold 16 cm in length, 4 cm in width and 4 cm in depth, and allowed to stand for 24 hours for spontaneous sedimentation with the mold placed in a dryer at 50° C. The mass as contained in the mold is further dried in the dryer at 110° C. to obtain a shaped body. A piece, about 2 mm in length, about 2 mm in width and about 1 mm in thickness, is cut out from the shaped body, then fixed with a mixture of methyl methacrylate, ethyl methacrylate and n-butyl methacrylate resins and thereafter sliced successively by a super microtome in a thickness of about 1.5 μm such that a secondary particle is contained in a series of slices from one end to the other end of the particle. The slices are photographed under a scanning electron microscope at a magnification of 2000×. The photographs are cut into the particle portions and space portions which are weighed on a chemical balance respectively. Since the weight ratio thus determined is approximately constant for any other like series of slices, the weight ratio of the secondary particle portions can be regarded as the volume ratio of the secondary particles in the shaped body. Accordingly the average apparent density can be calculated from the following equation.

$$\text{Average apparent density (g/m}^2\text{)} = \frac{\text{Density of shaped body}}{\text{Volume ratio of particles}}$$

in which: Volume ratio of particles $$= \frac{\text{Weight of particle portions}}{\text{Weight of particle portions + Weight of space portions}} \quad (5)$$

(5) The secondary particles of the invention have a shell about 0.1 to about 7.0 μm in thickness, and have a density of 0.02 to 0.06 g/cm$^3$ when made into a shaped body by spontaneous sedimentation. The particles have an average shell density Y defined by the equation $$Y = 0.0033 X + B$$

wherein X is the average diameter of the particles in the range of 15 μm ≦ X ≦ 40 μm, and B is a constant in the range of 0 ≦ B ≦ 0.115. FIG. 7 shows the distribution of average shell densities in the hatched area. FIG. 7 also shows the distribution of average apparent densities of secondary particles in the boxed area. The shell thickness, the density of the spontaneous sedimentation shaped body and the average shell density are measured by the following methods. Shell thickness (μm):

The same surfactant as used above is uniformly admixed with an aqueous slurry of secondary particles of the invention in an amount of 1 part by weight per 100 parts by weight of the slurry. A 200 g quantity of the mixture is poured into the same mold as used above and allowed to stand for 24 hours for spontaneous sedimentation with the mold placed in a dryer at 50° C. The mass is further dried, as contained in the mold, within the dryer at 110° C. to obtain a shaped body. A piece, about 2 mm in length, about 2 mm in width and about 1 mm in thickness, is cut out from the shaped body, then fixed with a mixture of methyl methacrylate, ethyl methacrylate and n-butyl methacrylate resins and thereafter sliced by a super microtome in a thickness of about 1.5 μm. The slices are photographed under a scanning electron microscope at magnifications of 600× and 2000× to measure the minimum and maximum thicknesses of the secondary particles. The minimum and maximus thus measured provide the range of thicknesses of the shells. Density of the spontaneous sedimentation shaped body (g/cm$^3$).

The same surfactant as used above is uniformly admixed with an aqueous slurry (concentration: z% by weight) of secondary particles of the invention in an amount of 1 part by weight per 100 parts by weight of the slurry. A 200 g quantity of the mixture is poured into the same mold as above and allowed to stand for 24 hours for spontaneous sedimentation in a dryer at 50° C. The mass as contained in the mold is further dried in the dryer at 110° C. The volume (V) of the resulting shaped body is measured. The density of the shaped body thus formed by spontaneous sedimentation is calculated from the following equation.

$$\text{Density (g/cm}^3\text{)} = \frac{W(g)}{V(\text{cm}^3)}$$

in which the weight (W g) of the shaped body is given by $200 \times 100/101 \times z/100$ (g).

Average shell density (g/cm$^3$):

Calculated from the following equation.

$$\text{Average shell density (g/cm}^3\text{)} = \frac{\text{Average weight of one particle}}{\text{Average volume of shell of one particle}}$$

The average volume of the shell of one particle is given by $4/3\pi[(r)^3 - (r-d)^3]$ wherein r is the average radius of the secondary particles, and d is the average thickness of the shell.

The average weight of one particle (g) is given by [average apparent density (g/cm$^3$)]×[volume of one particle having average diameter (cm$^3$)].

The average diameter of the particles is determined by plotting the outside diameters of the secondary particles vs. relative frequency to obtain a cumulative curve of the outside diameters and reading the outside diameter at a cumulative weight percent of 50%.

In addition to the characteristics described above, the secondary particles of this invention are further characterized by burrs provided by calcium silicate crystals projecting from the surface of the particle. FIG. 5 is an electron micrograph showing secondary particles of Example 1 of the invention given later, at a magnification of 6000×.

As already stated, the secondary particles of the invention are in the form of hollow globes composed of a large number of calcium silicate crystals of the wollastonite group which are interlocked with one another three-dimensionally. The particles have a very large average spontaneous sedimentation height of at least 800 ml. The large spontaneous sedimentation height indicates that the globular secondary particles per se are extremely light and have very low settling properties in water. This is one of distinct features of the secondary particles of the invention. The secondary particles of the invention further include those having an average apparent density of 0.05 g/cm$^3$ which is lower than that of almost any other like particles heretofore available. Accordingly such secondary particles afford super-light calcium silicate shaped bodies having a density of about 0.05 g/cm$^3$. Despite the low density, the shaped bodies have bending strength of at least 0.5 kg/cm$^2$ and therefore satisfactory useful strength because they are composed of hollow globular secondary particles.

Most of the secondary particles of the invention, usually at least about 80% thereof, are about 10 to about 50 μm in outside diameter.

The secondary particles of the invention can be produced, for example, by dispersing fine siliceous particles up to 0.5 μm in average diameter in water to prepare a slurry, admixing the slurry with milk of lime having a sedimentation volume of at least 5 ml to obtain a starting slurry containing water in an amount of at least 30 times the weight of the solids of the starting slurry, subjecting the starting slurry to hydrothermal reaction with application of pressure and heat and with continuous or temporarily interrupted stirring to prepare an active slurry of calcium silicate crystals, and drying the active slurry. This process will be described below in greater detail.

According to this invention, fine siliceous particles up to 0.5 μm in average diameter are used in the form of an aqueous slurry as a siliceous material.

The term "average diameter of particles" as used in this invention means the diameter of specific surface area as measured by the BET method and calculated from the following equation.

Specific surface area diameter $$(dsp) = \frac{K}{\rho \cdot S_w}$$

in which $\rho$ is the specific gravity of siliceous material, $S_w$ is specific surface area (as measured by the BET method) and K is a shape factor (6, assuming that the particle is spherical).

Typical of useful fine paricle siliceous materials is so-called silicon dust resulting from the production of silicon metal, ferrosilicon and compounds thereof as a by-product in large quantities. Silicon dust is usually 0.05 to 0.5 μm in average diameter, contains amorphous silica as the main component and has an SiO$_2$ content of at least 80% by weight and a bulk density of up to about 0.2 g/cm$^3$. Silicon dust, unlike natural siliceous material, is an artificial product and is therefore commercially available easily at a low cost with a considerably uniform composition and is very useful as a siliceous material. Typically silicon dust has the following chemical composition.

| | |
|---|---|
| SiO$_2$ | 80-99 by weight |
| Fe$_2$O$_3$ | 0-6 |
| CaO | 0-4 |
| Al$_2$O$_3$ | 0-4 |
| MgO | 0-3 |
| C | 0-4 |
| Miscellaneous | 0-5 |

Another example of suitable siliceous materials is fine particle reinforcing silica up to 0.5 μm in average diameter and heretofore used, for instance, as a filler for rubbers. Other siliceous materials, up to 0.5 μm in average diameter, are also useful in this invention, such as fine crystalline particles of quartzite, quartz, sandstone quartzite, cemented quartzite, recrystallized quartzite, composite quartzite, silica sand, silica stone, etc. and opalic silica stone. Provided that the siliceous materials have an average particle diameter in the above-specified range, the materials may contain relatively coarse particles. For use as the fine particle siliceous material, silicon dust, for example, can be used conjointly with a small amount of relatively large usual siliceous particles.

According to the invention it is critical to use such fine siliceous particles in the form of an aqueous slurry as a siliceous material. When the slurry of fine siliceous particles is used in combination with the specific lime material to be described later and made into a starting slurry having water to solids ratio by weight of 30:1 or greater, the starting slurry gives super-light globular secondary particles of calcium silicate and eventually super-light shaped bodies of calcium silicate as contemplated, when further subjected to hydrothermal reaction with stirring.

The aqueous slurry can be prepared, for example, by adding fine siliceous particles to an amount of water at least equal to the amount of the particles by weight and thoroughly dispersing the particles in the water with use of a mechanical stirring device such as a homogenizer. With this invention the slurry is advantageously usable in which 70% by weight of the particles are up to 2 μm in diameter (hereinafter referred to as "particles at cumulative weight percent of 70% are up to 2 μm"). To obtain the desired slurry, fine siliceous particles are dispersed in varying amounts of water by various dispersing methods to prepare slurries each 1000 ml in quantity and containing 50 g of solids, and the distribution of particle sizes in each of the slurries is measured according to the method of JIS A 1204-1970 to identify the slurry having the specified particle sizes. Particles of various materials including siliceous materials are generally more likely to agglomerate into larger particles in water with a decrease in particle size although the degree of agglomeration varies with the kind and properties of the particles. For this reason, fine siliceous particles up to 0.5 μm, when merely placed into water, usually will not provide a uniform slurry but agglomerate in the water, with the result that the particles at cumulative weight percent of 70% become larger in diameter. Slurries containing particles of low dispersibility will present difficulty in the production of contemplated shaped bodies, whereas such difficulty is avoidable for the production of the desired product with use of a slurry in which fine siliceous particles have been dispersed in water by high-speed or forced stirring as with a homomixer so that the particles at cumulative percent of 70% are up to 2 μm in diameter. If the stirring conditions such as speed of stirring for effecting the dispersion are stricter, the particle diameter can be decreased in a shorter period of time in achieving the cumulative weight percent of 70%. A dispersant such as sodium metaphosphate is usable for dispersing the particles.

According to the invention, it is also critical to use the above-specified siliceous material in combination with milk of lime having a sedimentation volume of at least 5 ml.

The sedimentation volume of milk of lime referred to in this specification is a value obtained by preparing 50 ml of milk of lime having a water to solids ratio by weight of 120:1, allowing the milk to stand for 20 minutes in a cylindrical container 1.3 cm in diameter and at least 50 cm³ in capacity and measuring the volume (ml) of the resulting sediment of the particles of the lime. Thus a sedimentation volume of 10 ml means that the volume of such sediment is 10 ml, with 40 ml of a supernatant above the sediment in the container. Accordingly the value of the sedimentation volume is indicative of the degree of fineness of the lime particles in the water; the value, if large, indicates that the lime particles are very fine and are dispersed in the water with stability and are less prone to sedimentation. With this invention, various milks of lime are usable effectively if having a sedimentation volume of at least 5 ml. The sedimentation volume of the milk of lime is dependent on the limestone used as the raw material, calcination temperature and time, the amount of water and temperature used for slaking, stirring or grinding conditions involved in slaking, etc. It is dependent especially largely on the temperature and stirring or grinding conditions employed for slaking. Milks of lime having a sedimentation volume of at least 5 ml can be prepared when such conditions are used in ingenious combination. In the technique for producing shaped bodies of calcium silicate, no investigation has been made on the effect of sedimentation volume of milk of lime used as a lime material on the properties of the shaped body obtained, nor has it been attempted to use as a lime material a special milk of lime having such high dispersibility as to have a sedimentation volume of at least 5 ml. While the lime material for the production of shaped bodies of the type described may be prepared in the form of a milk of lime, the milk of lime is usually lower than 5 ml in sedimentation volume. The milk of lime having a sedimentation volume of at least 5 ml to be used in this invention is prepared typically by treating water and lime, for example in a water to solids ratio by weight of 5:1, preferably at a temperature of at least 60° C. in a homomixer for highspeed or forced stirring, or in a wet grinder for grinding, and dispersing the mixture in water. The speed and intensity of stirring as by the homomixer can be usually reduced when the stirring is conducted at a higher temperature or for a prolonged period of time. Various stirrers with or without a baffle plate are usable for this purpose. Similarly various grinders are effectively usable. Various lime materials are useful for the preparation of the milk of lime. Typical example is quick lime. Although slaked lime, carbide slag, etc. are usuable, milk of lime having a large sedimentation volume can be prepared most easily from quick lime.

The mole ratio of the specific siliceous material to the lime material, when altered, produces a difference in the type of calcium silicate crystals afforded by hydrothermal reaction. Lower mole ratios yield tobermorite, while higher mole ratios lead to formation of dicalcium silicate hydrate, etc. The mole ratios suitable for the formation of xonotlite crystals are usually in the range of about 0.8 to about 1.2, especially in the range of about 0.92 to about 1.0.

For practicing the present invention, a starting slurry is prepared first by mixing a slurry of fine siliceous particles and milk of lime so that the two materials are in the desired mole ratio within the foregoing range. The starting slurry must contain water in an amount of at least 30 times the weight of the total solids in the starting slurry. If the water contained in the slurry of siliceous material and milk of lime used is insufficient to afford the specified proportion of water, the amount of water is adjusted with addition of water. The amount of water is preferably about 35 to about 80 times, more preferably about 40 to 70 times, the total weight of the solids in the starting slurry. The super-light secondary particles of calcium silicate and, accordingly, light calcium silicate shaped bodies contemplated by the invention can be produced only when water is used in a quantity much larger than the quantities heretofore used for the production of shaped bodies of this type.

With this invention, the starting slurry thus prepared is subjected to hydrothermal reaction with application of pressure and heat and with continuous or temporarily interrupted stirring. The starting slurry can be stirred by any of various methods insofar as the solids in the slurry can be held dispersed uniformly in the aqueous medium. The slurry can be stirred, for example, with a mechanical device, air or liquid or by vibration. The reaction conditions such as pressure, stirring speed, etc. are suitably determined in accordance with the type of the reactor, stirring device and reaction product, etc. The preferred pressure is usually about 8 to 50 kg/cm², while the preferred temperature is about 175° to about 264° C. The reaction can be completed within a shorter period of time with an increase in the pressure.

The hydrothermal reaction stated above gives a slurry of xonotlite and/or foshagite crystals containing numerous globular secondary particles of the invention as dispersed in water. The secondary particles can be obtained by drying the slurry without impairing the shape of the particles. Globular secondary particles of wollastonite crystals can be obtained according to this invention when the above secondary particles are baked at a temperature of at least 800° C. so as not to impair the shape of the particles.

For the production of the globular secondary particles of the invention, inorganic fibers such as asbestos, rock wool and glass fibers can be incorporated into the starting slurry. When such inorganic fibers are incorporated into the starting slurry, the calcium silicate crystals formed by the hydrothermal reaction are very likely to form globular secondary particles on the fibrous material, with the result that the globular secondary particles are partly joined with the fibers. Such slurry gives shaped bodies of higher mechanical strength than a slurry of calcium silicate crystals to which inorganic fibers are added, i.e. after it has been prepared from a starting slurry.

The globular secondary particles of this invention can be dispersed or suspended in water with ease to form a slurry with their structure retained free of deterioration. The slurry can be made into a shaped body merely when it is shaped to the desired form and dried. The amount of water to be used for the preparation of slurry, which is widely variable, is usually about 15 to about 100 times, preferably about 20 to about 80 times, the weight of the solids.

The aqueous slurry of globular secondary particles of the invention, when shaped and then dried, affords a super-light shaped body. Due to the presence of water in the hollow portions of the globular secondary particles forming the slurry, the particles will not be easily broken down even when subjected to the shaping pressure, while the globular secondary particles are rigidly joined with one another by the engagement between the numerous burrs projecting from their surfaces. During drying, the water is removed from the hollow portions. As a result, the shaped body obtained is very light and has sufficient useful strength.

The slurry can be shaped by various methods, for example, by injection molding, with use of a press for dewatering and shaping, or with use of a sheet making machine. It is also possible to subject the slurry to spontaneous sedimentation and dry the resulting mass to a shaped body. Use of increased pressure for dewatering the slurry during shaping gives a shaped body of increased density and enhanced strength. The shaped mass may slightly shrink during drying, in which case it is preferable to incorporate a surfactant or reinforcing material into the slurry in an amount capable of effectively preventing the shrinkage. In this case when a surfactant is incorporated into a starting slurry, the shrinkage may be effectively prevented. The amount is widely variable in accordance with the conditions under which the slurry is prepared, the materials of the slurry, shaping method, etc. Useful surfactants include nonionic, cationic and anionic surfactants, such as those of quaternary ammonium type, fluorine type, higher alcohol type, straight-chain alkylbenzene type, alkyl sulfate type, polyoxyethylene alkyl phenol type, sorbitan-fatty acid ester type, etc. These surfactants can be used in admixture. Commercial products containing such surfactants are also usable. The surfactants are used in an amount, calculated as solids, of 0.01 to 5% by weight, preferably 0.02 to 2% by weight, based on the weight of the slurry or starting slurry. Examples of useful reinforcing materials are inorganic fibers such as asbestos, rock wool, glass fiber, ceramics fiber, carbon fiber and metal fiber; natural fibers such as pulp, cotton, wood fiber, hemp, etc.; and synthetic fibers such as rayon and fibers of polyacrylonitrile, polypropylene, polyamide and polyester. These fibers are usable singly, or at least two of them are usable in combination. Examples of other useful reinforcing materials are cements such as portland cement and alumina cement, clay, gypsum, binders of phosphoric acid and water glass type, organic binders, etc. A wide variety of such reinforcing materials are usable depending on the properties desired of the shaped body and contemplated use. They are usable in a suitably determined amount. For example, it is suitable to use inorganic or organic fibers in an amount of usually up to 50% by weight, preferably 5 to 20% by weight, clays in an amount of 3 to 50% by weight, preferably 5 to 40% by weight, and cements in an amount of about 0.5 to about 40% by weight, all based on the weight of the solids in the slurry.

The shaped mass, when dried, gives a very light calcium silicate shaped body which has never been heretofore available. The shaped body has a density of about 0.04 g/cm$^3$ and has useful strength.

This invention will be described below in greater detail with reference to examples, in which the parts and percentages are all by weight.

EXAMPLE 1

Figure 1:
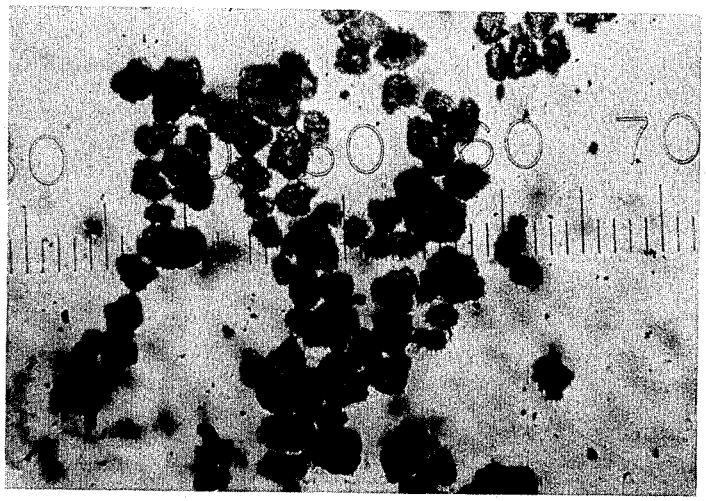
FIG. 1 is a photograph of globular secondary particles of this invention taken under an optical microscope at a magnification of 200×.

Quick lime (19.94 parts, containing 95.02% of CaO) is slaked in 478.6 parts of hot water at 95° C., and the mixture is stirred in a homomixer at a high speed for 7 minutes to prepare milk of lime having a sedimentation volume of 18.7 ml. Subsequently an aqueous suspension (concentration 4.76%) of ferrosilicon dust (containing 92.0% of SiO$_2$) 0.24 μm in average particle diameter is stirred in a homomixer at a high speed for 5 minutes to disperse the dust particles and obtain an aqueous slurry 1.2 μm in particle diameter at cumulative weight percent of 70%. The milk of lime is admixed with a portion of the aqueous slurry of the ferrosilicon dust (22.06 parts, calculated as solids), and the mixture is stirred with addition of water to obtain a starting slurry having a water to solids ratio by weight of 50:1. The starting slurry is subjected to hydrothermal reaction at saturated water vapor pressure of 12 kg/cm$^2$ at a temperature of 191° C. for 8 hours in an autoclave having an inside diameter of 15 cm, with a stirrer driven at 112 r.p.m. to obtain a slurry of crystals. The slurry is dried at 110° C. for 24 hours and thereafter subjected to X-ray diffractiometry, which reveals that the crystals are xonotlite crystals.

The slurry is dried on slide glass and then photographed under an optical microscope at a magnification of 200×. The photograph reveals globular secondary particles 28 μm in average outside diameter as shown in FIG. 1. An observation of the dry slurry by the reflection method reveals that the particles have distinct contours and substantially transparent interior.

Figure 2:
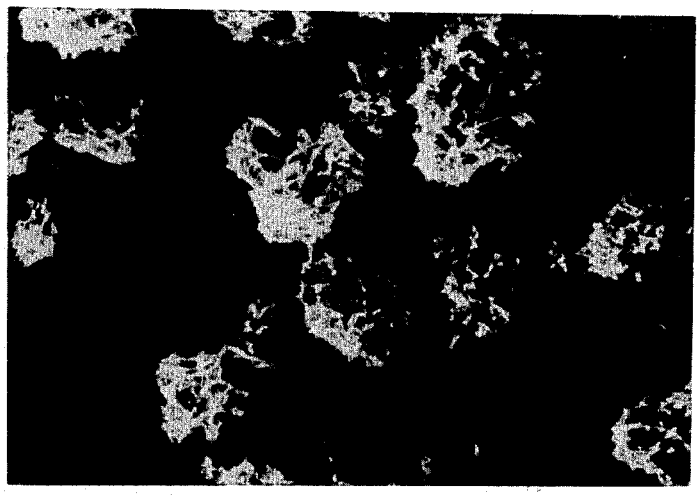
FIG. 2 is a scanning electron micrograph showing the same particles at a magnification of 600×.
Figure 3:
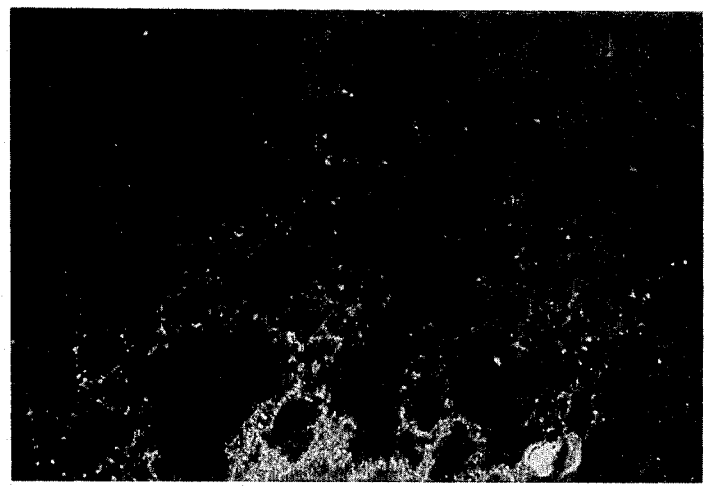
FIGS. 3 and 4 are scanning electron micrographs at magnifications of 600× and 2000×, respectively of about 1.5 μm thick slice prepared by subjecting secondary particles of the invention to spontaneous sedimentation to obtain a shaped body, cutting out a piece from the body and slicing the piece after fixing the piece with a resin mixture.
Figure 4:
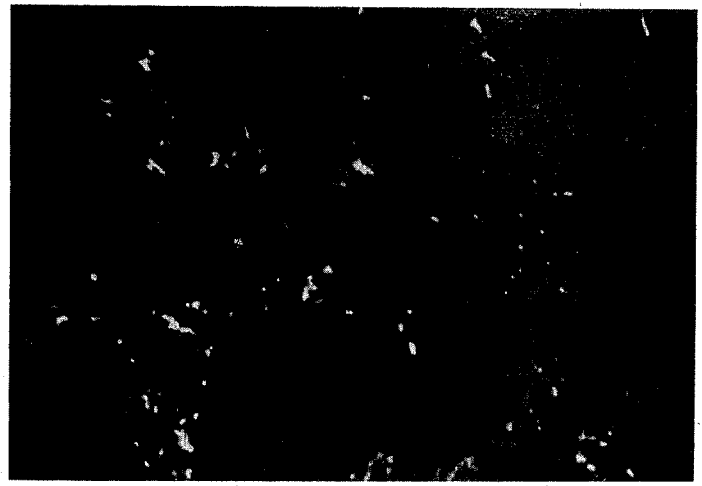
Figure 5:
FIG. 5 is an electron micrograph showing secondary particles of the invention at a magnification of 6000×.
Figure 6:
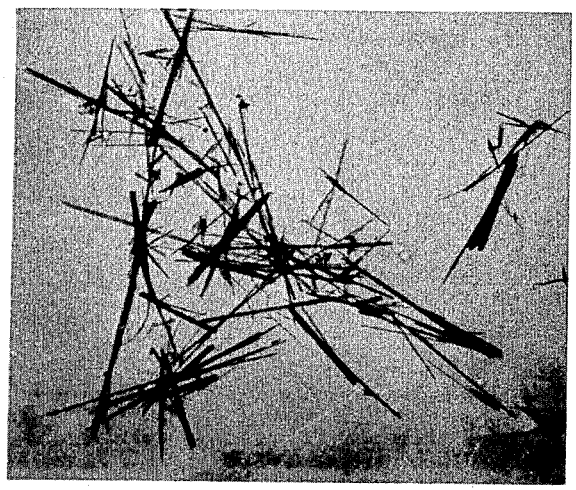
FIG. 6 is an electron micrograph at a magnification of 8000× showing xonotlite crystals forming secondary particles of the invention.
Figure 7:
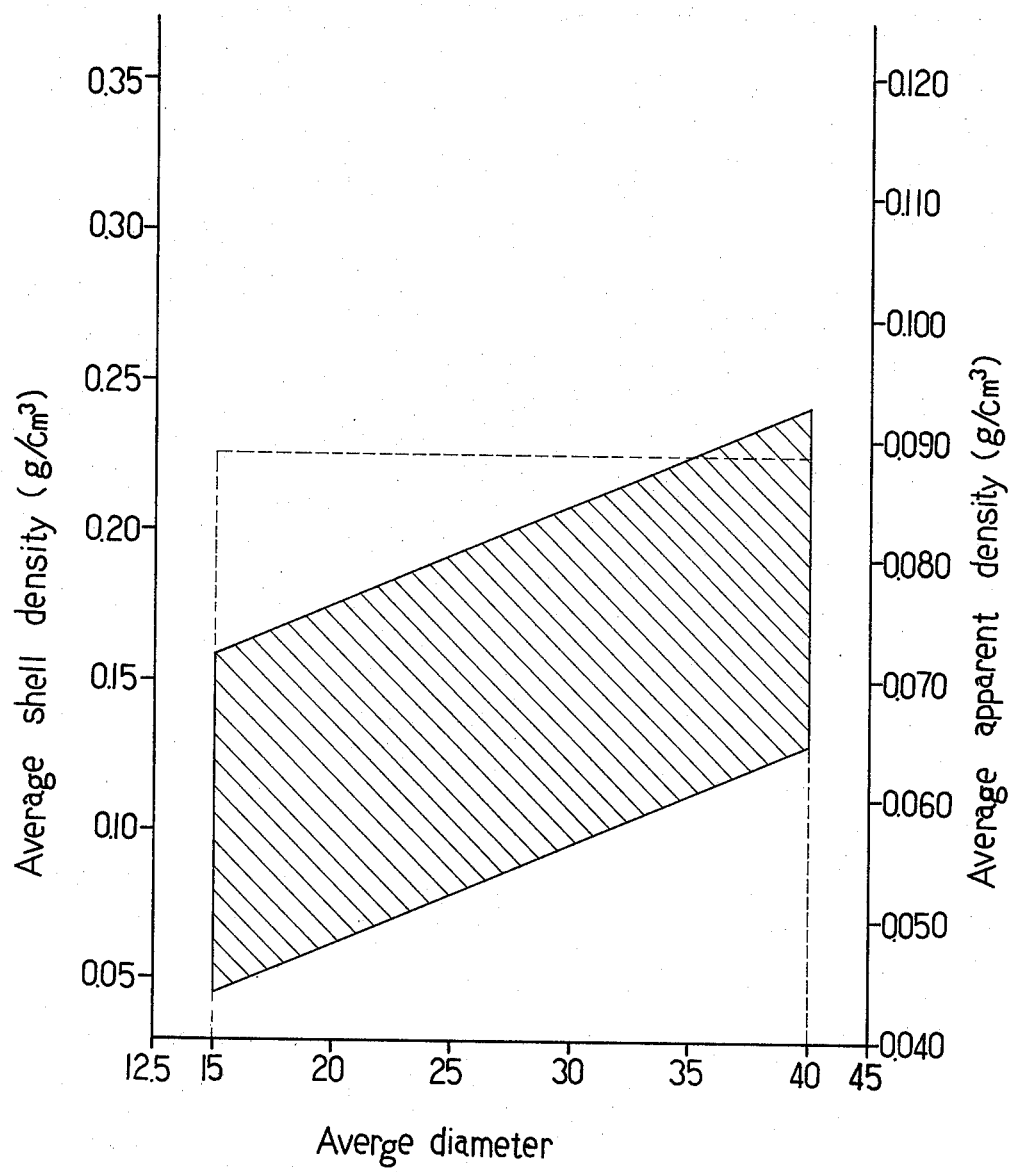
FIG. 7 is a graph showing average shell densities and bulk densities of globular secondary particles of the invention.

One part of a nonionic surfactant ("FC-430," trademark for a surfactant consisting mainly of fluorocarbon and manufactured by Sumitomo 3M Co., Ltd., effective component 100%) is admixed with the slurry of crystals per 100 parts of the slurry. A 200 g quantity of the mixture is then placed into a mold 16 cm in length, 4 cm in width and 4 cm in depth, and allowed to stand for 24 hours for spontaneous sedimentation with the mold placed in a dryer at 50° C. The mass as contained in the mold is further dried in the dryer at 110° C. to obtain a shaped body. A piece is cut out from the shaped body, then fixed with a mixture of methyl methacrylate, ethyl methacrylate and n-butyl methacrylate resins and thereafter sliced by a super microtome. The slice is photographed under a scanning electron microscope at magnifications of 600× and 2000×. FIGS. 3 and 4 presenting the photographs reveal that the particles have a shell thickness of 0.1 to 7 μm, an average shell thickness of 2.25 μm and substantially hollow interior. An electron micrograph of the secondary particles taken at a magnification of 6000× reveals that the shells have numerous burrs on the surface due to the presence of xonotlite crystals as seen in FIG. 5. FIG. 2 is a scanning electron micrograph of the secondary particles at 600× which shows that the particles have a hollow globular shell composed of a large number of xonotlite crystals interlocked with one another three-dimensionally. The xonotlite crystals (primary particles) forming the secondary particle are needlelike crystals 1 to 20 μm in length and about 0.05 to about 1.0 μm in width as seen in FIG. 6 which is an electron micrograph at 8000×. These crystals, when baked at 1000° C. for 3 hours, are converted to β-wollastonite crystals.

Table 1 shows properties of the secondary particles.

TABLE 1

| Properties | Measurements |
|---|---|
| Average particle diameter (μm) | 28 |
| Range of outside diameters of 80% of the particles (μm) | 10–50 |
| Average apparent density (g/cm$^3$) | 0.053 |
| Average weight of particles (g) | $6.09 \times 10^{-10}$ |
| Thickness of shell (μm) | 0.1–7 |
| Average shell thickness (μm) | 2.25 |
| Average shell density (g/cm$^3$) | 0.130 |

The same surfactant as used above is admixed with the slurry of xonotlite crystals obtained as above, in an amount of 1 part per 100 parts of the slurry. A 200 g quantity of the slurry is then poured into a mold, 16 cm in length, 4 cm in width and 4 cm in depth, and allowed to stand for 24 hours for spontaneous sedimentation with the mold placed in a dryer at 50° C. The mass as contained in the mold is further dried in the dryer at 110° C. to obtain a shaped body having a density of 0.031 g/cm$^3$. The slurry of crystals has an average spontaneous sedimentation height of 950 ml.

Specimens of shaped bodies are prepared from portions of the slurry prepared as above (each 88 parts, calculated as solids) by adding 5 parts of glass fiber, 4 parts of pulp and 3 parts of cement to the slurry (specimen I), or by adding 5 parts of glass fiber, 4 parts of pulp, 3 parts of cement and 20 parts of a mixture of a nonionic surfactant and an anionic surfactant (trade mark "Guranatupu NF-50," product of Sanyo Kasei Kogyo Co., Ltd., containing 20% solids) to the slurry (specimen II), thoroughly mixing the ingredients, shaping the mixture by a press and drying the shaped mass at 120° C. for 20 hours. Other specimens are produced in the same manner as above except that the surfactants used are 6.7 parts of an anionic surfactant (product of Tokyo Kaseikogyo Co., Ltd., containing sodium dodecylbenzene sulfonate and having a solids content of 60%) for specimen III, 4 parts of a nonionic surfactant (product of Tokyo Kaseikogyo Co., Ltd., containing polyoxyethylene sorbitan monooleate, effective component 100%) for specimen IV, and 4 parts of cationic surfactant (product of Tokyo Kaseikogyo Co., Ltd., containing dimethylbenzylphenylammonium chloride, solids content 100%) for specimen V. Table 2 shows properties of the specimens.

TABLE 2

| Properties | Specimen No. | | | | |
|---|---|---|---|---|---|
| | I | II | III | IV | V |
| Density (g/cm$^3$) | 0.056 | 0.051 | 0.051 | 0.053 | 0.053 |
| Bending strength (kg/cm$^2$) | 1.79 | 1.45 | 1.42 | 1.56 | 1.59 |
| Specific strength | 570.8 | 557.5 | 545.9 | 555.4 | 566.0 |
| Linear shrinkage on drying (%) | 2.73 | 0.53 | 0.57 | 0.49 | 0.63 |

The properties listed above are measured by the following methods.
Bending strength: According to JIS A 9510.
Specific strength: Given by $$\frac{\text{Bending strength}}{(\text{Density})^2}$$

The specimens exhibit the properties shown in Table 3 when baked at 850° C. for 3 hours.

TABLE 3

| Properties | Specimen No. | | | | |
|---|---|---|---|---|---|
| | I | II | III | IV | V |
| Density (g/cm$^3$) | 0.053 | 0.049 | 0.049 | 0.050 | 0.050 |
| Bending strength (kg/cm$^2$) | 1.24 | 1.03 | 1.00 | 1.05 | 1.10 |
| Specific strength | 441.4 | 429.0 | 416.5 | 420.0 | 440.0 |
| Linear shrinkage after heating (%) | 0.51 | 0.47 | 0.48 | 0.43 | 0.49 |
| Residual specific strength | 77.3 | 77.0 | 76.3 | 75.6 | 77.7 |

The residual specific strength is calculated from the following equation.

Residual specific strength = 
$$\frac{\text{Specific strength after baking}}{\text{Specific strength before baking}} \times 100$$

EXAMPLE 2

Quick lime (16.65 parts, containing 95.0% of CaO) is slaked in 499.5 parts of hot water at 95° C., and the mixture is stirred in a homomixer at a high speed for 30 minutes to prepare milk of lime having a sedimentation volume of 43.9 ml. Subsequently an aqueous suspension (concentration 7.69%) of ferrosilicon dust (containing 92.0% of SiO$_2$) 0.24 μm in average particle diameter is stirred in a homomixer at a high speed for 5 minutes to disperse the dust particles and obtain an aqueous slurry 1.2 μm in particle diameter at cumulative weight percent of 70%. The milk of lime is admixed with a portion of the aqueous slurry of the ferrosilicon dust (18.35 parts, calculated as solids), and the mixture is stirred with addition of water to obtain a starting slurry having a water to solids ratio by weight of 60:1. The starting slurry is subjected to hydrothermal reaction at saturated water vapor pressure of 12 kg/cm$^2$ at a temperature of 191° C. for 8 hours in the same autoclave as used in Example 1, with a stirrer driven at 112 r.p.m. to obtain a slurry of crystals. The slurry is dried at 110° C. for 24 hours and thereafter subjected to X-ray diffractiometry, which reveals that the crystals are xonotlite crystals. When observed under an optical microscope in the same manner as in Example 1, the slurry is found to contain globular secondary particles having an average outside diameter of 35 μm. An observation of the slurry by the reflection method reveals that the particles have distinct contours and substantially transparent interior. In the same manner as in Example 1, a shaped body is prepared from the slurry of crystals by spontaneous sedimentation. A portion of the body is fixed with a mixture of methyl methacrylate, ethyl methacrylate and n-butyl methacrylate resins and thereafter sliced with a super microtome. An observation of the slice under a scanning electron microscope reveals that the particles have a shell thickness of 0.1 to 6 μm, an average shell thickness of 2.51 μm and substantially hollow interior. An electron microscopic observation of the particles indicates that the shells have numerous burrs on the surface due to the presence of xonotlite crystals. A further observation of the secondary particle under a scanning electron microscope indicates that the particle has a hollow globular shell composed of a large number of xonotlite crystals interlocked with one another three-dimensionally. When observed under an electron microscope, the xonotlite crystals (primary crystals) forming the secondary particle are found to be needlelike crystals 1 to 20 μm in length and about 0.05 to 1.0 μm in width. These crystals, when baked at 1000° C. for 3 hours, give β-wollastonite crystals.

Table 4 below shows properties of the secondary particles.

TABLE 4

| Properties | Measurements |
| --- | --- |
| Average particle diameter (μm) | 35 |
| Range of outside diameters of 80% of the particles (μm) | 20–50 |
| Average apparent density (g/cm³) | 0.045 |
| Average weight of particles (g) | 1.009 × 10⁻⁹ |
| Thickness of shell (μm) | 0.1–6 |
| Average shell thickness (μm) | 2.51 |
| Average shell density (g/cm³) | 0.121 |

In the same manner as in Example 1, the slurry of xonotlite crystals is made into a shaped body by spontaneous sedimentation. The body had a density of 0.027 g/cm³. The slurry of crystals has an average spontaneous sedimentation height of 970 ml.

A specimen of shaped body is prepared from a portion of the slurry prepared as above (88 parts, calculated as solids) by thoroughly admixing 5 parts of asbestos, 3 parts of glass fiber and 3 parts of cement with the slurry, press-shaping the mixture and drying the shaped mass at 120° C. for 20 hours (specimen I). Specimen II is prepared in the same manner as above except that 27.1 parts of the same mixture of nonionic and anionic surfactants as used in Example 1 is incorporated into the slurry. Table 5 shows properties of the specimens.

TABLE 5

| Properties | Specimen No. I | Specimen No. II |
| --- | --- | --- |
| Density (g/cm³) | 0.054 | 0.052 |
| Bending strength (kg/cm²) | 1.33 | 1.28 |
| Specific strength | 456.1 | 473.4 |
| Linear shrinkage on drying (%) | 0.66 | 0.42 |

The specimens, when baked at 850° C. for 3 hours, have the properties listed in Table 6 below.

TABLE 6

| Properties | Specimen No. I | Specimen No. II |
| --- | --- | --- |
| Density (g/cm³) | 0.051 | 0.049 |
| Bending strength (kg/cm²) | 0.870 | 0.774 |
| Specific strength | 334.5 | 322.4 |
| Linear shrinkage after heating (%) | 0.71 | 0.53 |
| Residual specific strength | 73.3 | 68.1 |

EXAMPLE 3

Quick lime (20.23 parts, containing 95.0% of CaO) is slaked in 485.5 parts of hot water at 85° C., and the mixture is stirred in a homomixer at a high speed for 5 minutes to prepare milk of lime having a sedimentation volume of 13.0 ml. Subsequently an aqueous suspension (concentration 5.45%) of finely divided silica stone particles comprising crystalline silica and amorphous silica (containing 97.0% of $SiO_2$) 0.093 μm in average particle diameter is stirred in a homomixer at a high speed for 30 minutes to disperse the silica particles and obtain an aqueous slurry 0.36 μm in particle diameter at cumulative weight percent of 70%. The milk of lime is admixed with a portion of the aqueous slurry of the finely divided silica stone particles (21.77 parts, calculated as solids), and the mixture is stirred with addition of water to obtain a starting slurry having a water to solids ratio by weight of 50:1. The starting slurry is subjected to hydrothermal reaction at saturated water vapor pressure of 12 kg/cm² at a temperature of 191° C. for 8 hours in the same autoclave as used in Example 1, with a stirrer driven at 112 r.p.m. to obtain a slurry of crystals. The slurry is dried at 110° C. for 24 hours and thereafter subjected to X-ray diffractiometry, which reveals that the crystals are a mixture of large amount of xonotlite crystals and small amount of tobermorite crystals. When observed under an optical microscope in the same manner as in Example 1, the slurry is found to contain globular secondary particles having an average outside diameter of 18 μm. An observation of the slurry by the reflection method reveals that the particles have distinct contours and substantially transparent interior. In the same manner as in Example 1, a shaped body is prepared from the slurry of crystals by spontaneous sedimentation. A portion of the body is fixed with a mixture of methyl methacrylate, ethyl methacrylate and n-butyl methacrylate resins and thereafter sliced with a super microtome. An observation of the slice under a scanning electron microscope reveals that the particles have a shell thickness of 0.5 to 1.7 μm, an average shell thickness of 1.47 μm and substantially hollow interior. An electron microscopic observation of the particles indicates that the shells have numerous burrs on the surface due to the presence of xonotlite crystals. A further observation of the secondary particle under a scanning electron microscope indicates that the particle has a hollow globular shell composed of a large number of xonotlite crystals interlocked with one another three-dimensionally. When the particles are observed under an electron microscope, the xonotlite crystals (primary crystals) forming the secondary particle are found to be needlelike crystals 1 to 20 μm in length and about 0.05 to 1.0 μm in width and also the tobermorite crystals are found to be platelike crystals. These crystals, when baked at 1000° C. for 3 hours, give β-wollastonite crystals.

Table 7 below shows properties of the secondary particles.

TABLE 7

| Properties | Measurements |
| --- | --- |
| Average particle diameter (μm) | 18 |
| Range of outside diamters of 80% of the particles (μm) | 10–28 |
| Average appparent density (g/cm$^3$) | 0.053 |
| Average weight of particles (g) | 1.62 × 10$^{-10}$ |
| Thickness of shell (μm) | 0.5–1.7 |
| Average shell thickness (μm) | 1.47 |
| Average shell density (g/cm$^3$) | 0.128 |

In the same manner as in Example 1, the slurry of xonotlite crystals is made into a shaped body by spontaneous sedimentation. The body had a density of 0.032 g/cm$^3$. The slurry of crystals has an average spontaneous sedimentation height of 965 ml.

A specimen of shaped body is prepared from a portion of the slurry prepared as above (90 parts, calculated as solids) by thoroughly admixing 5 parts of asbestos, 3 parts of glass fiber and 3 parts of cement with the slurry, press-shaping the mixture and drying the shaped mass at 120° C. for 20 hours (specimen I). Specimen II is prepared in the same manner as above except that 22.9 parts of the same mixture of nonionic and anionic surfactants as used in Example 1 is incorporated into the slurry. Table 8 shows properties of the specimens.

TABLE 8

| Properties | Specimen No. I | Specimen No. II |
| --- | --- | --- |
| Density (g/cm$^3$) | 0.054 | 0.053 |
| Bending strength (kg/cm$^2$) | 1.40 | 1.33 |
| Specific strength | 480.1 | 473.5 |
| Linear shrinkage on drying (%) | 0.33 | 0.27 |

The specimens, when baked at 1000° C. for 3 hours, have the properties listed in Table 9 below.

TABLE 9

| Properties | Specimen No. I | Specimen No. II |
| --- | --- | --- |
| Density (g/cm$^3$) | 0.051 | 0.050 |
| Bending strength | 1.03 | 0.873 |
| Specific strength | 396.0 | 349.2 |
| Linear shrinkage after heating (%) | 0.67 | 0.81 |
| Residual specific strength | 82.5 | 73.7 |

EXAMPLE 4

Quick lime (19.99 parts, containing 95.0% of CaO) is slaked in 240 parts of hot water at 95° C., and the mixture is stirred in a homomixer at a high speed for 6.5 minutes to prepared milk of lime having a sedimentation volume of 17.8 ml. Subsequently an aqueous suspension (concentration 4.76%) of ferrosilicon dust (containing 92.0% of SiO$_2$) 0.24 μm in average particle diameter is stirred in a homomixer at a high speed for 5 minutes to disperse the dust particles and obtain an aqueous slurry 1.2 μm in particle diameter at cumulative weight percent of 70%. The milk of lime and 0.42 parts of asbestos of amosite type (S-11-65) are admixed with a portion of the aqueous slurry of the ferrosilicon dust (22.01 parts, calculated as solids), and the mixture is stirred with addition of water to obtain a starting slurry having a water to solids ratio by weight of 50:1. The starting slurry is subjected to hydrothermal reaction at saturated water vapor pressure of 12 kg/cm$^2$ at a temperature of 191° C. for 8 hours in the same autoclave as used in Example 1, with a stirrer driven at 112 r.p.m. to obtain a slurry of crystals. The slurry is dried at 110° C. for 24 hours and thereafter subjected to X-ray diffractiometry, which reveals that the crystals are xonotlite crystals. When observed under an optical microscope in the same manner as in Example 1, the slurry is found to contain globular secondary particles having an average outside diameter of 32 μm and partly joined with asbestos fibers. An observation of the slurry by the reflection method reveals that the particles have distinct contours and substantially transparent interior. In the same manner as in Example 1, a shaped body is prepared from the slurry of crystals by spontaneous sedimentation. A portion of the body is fixed with a mixture of methyl methacrylate, ethyl methacrylate and n-butyl methacrylate resins and thereafter sliced with a super microtome. An observation of the slice under a scanning electron microscope reveals that the particles have a shell thickness of 0.1 to 7 μm, an average shell thickness of 2.30 μm and substantially hollow interior. An electron microscopic observation of the particles indicates that the shells have numerous burrs on the surface due to the presence of xonotlite crystals. A further observation of the secondary particle under a scanning electron microscope indicates that the particle has a hollow globular shell composed of a large number of xonotlite crystals interlocked with one another three-dimensionally. When observed under an electron microscope, the xonotlite crystals (primary crystals) forming the secondary particle are found to be needlelike crystals 1 to 20 μm in length and about 0.05 to 1.0 μm in width. These crystals, when baked at 1000° C. for 3 hours, give β-wollastonite crystals.

Table 10 below shows properties of the secondary particles.

TABLE 10

| Properties | Measurements |
| --- | --- |
| Average particle diameter (μm) | 32 |
| Range of outside diameters of 80% of the particles (μm) | 10–50 |
| Average apparent density (g/cm$^3$) | 0.048 |
| Average weight of particles (g) | 8.23 × 10$^{-10}$ |
| Thickness of shell (μm) | 0.1–7 |
| Average shell thickness (μm) | 2.30 |
| Average shell density (g/cm$^3$) | 0.129 |

In the same manner as in Example 1, the slurry of xonotlite crystals is made into a shaped body by spontaneous sedimentation. The body had a density of 0.029 g/cm$^3$. The slurry of crystals has an average spontaneous sedimentation height of 954 ml.

A specimen of shaped body is prepared from a portion of the slurry prepared as above (88 parts, calculated as solids) by thoroughly admixing 4 parts of pulp, 5 parts of glass fiber and 3 parts of cement with the slurry, press-shaping the mixture and drying the shaped mass at 120° C. for 20 hours (specimen I). Specimen II is prepared in the same manner as above except that 20 parts of the same mixture of nonionic and anionic surfactants as used in Example 1 is incorporated into the slurry. Table 11 shows properties of the specimens.

Example 1 are admixed with a portion of the aqueous slurry of the ferrosilicon dust (22.01 parts, calculated as solids), and the mixture is stirred with addition of water to obtain a starting slurry having a water to solids ratio by weight of 50:1. The starting slurry is subjected to hydrothermal reaction at saturated water vapor pressure of 12 kg/cm$^2$ at a temperature of 191° C. for 8 hours in the same autoclave as used in Example 1, with a stirrer driven at 112 r.p.m. to obtain a slurry of cyrstals. The slurry is dried at 110° C. for 24 hours and thereafter subjected to X-ray diffractiometry, which reveals that the crystals are xonotlite crystals. Wen observed under an optical microscope in the same manner as in Example 1, the slurry is found to contain globular secondary particles having an average outside diameter of 28 μm. An observation of the slurry by the reflection method reveals that the particles have distinct contours and substantially transparent interior. In the same manner as in Example 1, a shaped body is prepared from the slurry of crystals by spontaneous sedimentation. A portion of the body is fixed with a mixture of methyl methacrylate, ethyl methacrylate and n-butyl methacrylate resins and thereafter sliced with a super microtome. An observation of the slice under a scanning electron microscope reveals that the particles have a shell thickness of 0.1 to 6 μm, an average shell thickness of 2.28 μm and substantially hollow interior. An electron microscopic observation of the particles indicates that the shells have numerous burrs on the surface due to the presence of xonotlite crystals. A further observation of the secondary particle under a scanning electron microscope indicates that the particle has a hollow globular shell composed of a large number of xonotlite crystals interlocked with one another three-dimensionally. When observed under an electron microscope, the xonotlite crystals (primary crystals) forming the secondary particle are found to be needle-like crystals 1 to 20 μm in length and about 0.05 to 1.0 μm in width. These crystals, when baked at 1000° C. for 3 hours, give β-wollastonite crystals.

Table 16 below shows properties of the secondary particles.

TABLE 16

| Properties | Measurements |
| --- | --- |
| Average particle diameter (μm) | 28 |
| Range of outside diameters of 80% of the particles (μm) | 10–50 |
| Average apparent density (g/cm$^3$) | 0.051 |
| Average weight of particles (g) | 5.86 × 10$^{-10}$ |
| Thickness of shell (μm) | 0.1–6 |
| Average shell thickness (μm) | 2.28 |
| Average shell density (g/cm$^3$) | 0.123 |

In the same manner as in Example 1, the slurry of xonotlite crystals is made into a shaped body by spontaneous sedimentation. The body had a density of 0.030 g/cm$^3$. The slurry of crystals has an average spontaneous sedimentation height of 943 ml.

Specimens of shaped body are prepared from portions of the slurry prepared as above (each 88 parts, calculated as solids) by throughly admixing 4 parts of pulp, 5 parts of glass fiber and 3 parts of cement with each portion, press-shaping the mixture and drying the shaped mass at 120° C. for 20 hours (specimens I and II). Table 17 shows properties of the specimens.

TABLE 17

| Properties | Specimen No. I | Specimen No. II |
| --- | --- | --- |
| Density (g/cm$^3$) | 0.050 | 0.053 |
| Bending strength (kg/cm$^2$) | 1.38 | 1.44 |
| Specific strength | 552.0 | 512.6 |
| Linear shrinkage on drying (%) | 0.37 | 0.41 |

The specimens when baked at 850° C. for 3 hours, have the properties listed in Table 18 below:

TABLE 18

| Properties | Specimen No. I | Specimen No. II |
| --- | --- | --- |
| Density (g/cm$^3$) | 0.048 | 0.050 |
| Bending strength (kg/cm$^2$) | 0.915 | 1.00 |
| Specific strength | 397.1 | 400.0 |
| Linear shrinkage after heating (%) | 0.56 | 0.61 |
| Residual specific strength | 71.9 | 78.0 |

COMPARISON EXAMPLE 1

Quick lime (51.38 parts, containing 95.0% of CaO) is slaked in 616.6 parts of hot water at 95° C., and the mixture is stirred in a homomixer at a high speed for 10 minutes to prepare milk of lime having a sedimentation volume of 25.5 ml. Subsequently 53.62 parts of finely divided silica stone (containing 97.5% of SiO$_2$) 3.7 μm in average particle diameter and composed of crystalline silica is added to the milk of lime, and the mixture is stirred with addition of water to obtain a starting slurry having a water to solids ratio by weight of 20:1. The starting slurry is subjected to hydrothermal reaction at saturated water vapor pressure of 12 kg/cm$^2$ at a temperature of 191° C. for 8 hours in the same autoclave as used in Example 1, with a stirrer driven at 174 r.p.m. to obtain a slurry of crystals. The slurry is dried at 110° C. for 24 hours and thereafter subjected to X-ray diffractiometry, which reveals that the crystals are a mixture of large amount of xonotlite crystals and small amount of tobermorite crystals. When observed under an optical microscope in the same manner as in Example 1, the slurry is found to contain globular secondary particles having an average outside diameter of 40 μm. An observation of the slurry by the reflection method reveals that the particles have distinct contours and substantially transparent interior. In the same manner as in Example 1, a shaped body is prepared from the slurry of crystals by spontaneous sedimentation. A portion of the body is fixed with a mixture of methyl methacrylate, ethyl methacrylate and n-butyl methacrylate resins and thereafter sliced with a super microtome. An observation of the slice under a scanning electron microscope reveals that the particles have a shell thickness of 0.5 to 6 μm, an average shell thickness of 2.60 μm and substantially hollow interior. An electron microscopic observation of the particles indicates that the shells have numerous burrs on the surface due to the presence of xonotlite crystals. A further observation of the secondary particle under a scanning electron microscope indicates that the particle has a hollow globular shell composed of a large number of xonotlite crystals interlocked with one another three-dimensionally. When the particles are observed under an electron microscope, the xonotlite crystals (primary crystals) forming the secondary particle are found to be needlelike crystals 1 to 20 μm in length and about 0.05 to 1.0 μm in width and also the tobermorite crystals are found to be platelike crystals.

TABLE 11

| Properties | Specimen No. I | Specimen No. II |
| --- | --- | --- |
| Density (g/cm$^3$) | 0.055 | 0.053 |
| Bending strength (kg/cm$^2$) | 1.82 | 1.65 |
| Specific strength | 601.6 | 587.4 |
| Linear shrinkage on drying (%) | 2.24 | 0.33 |

The specimens, when baked at 850° C. for 3 hours, have the properties listed in Table 12 below.

TABLE 12

| Properties | Specimen No. I | Specimen No. II |
| --- | --- | --- |
| Density (g/cm$^3$) | 0.053 | 0.050 |
| Bending strength (kg/cm$^2$) | 1.27 | 1.09 |
| Specific strength | 452.1 | 436.0 |
| Linear shrinkage after heating (%) | 0.62 | 0.45 |
| Residual specific strength | 75.1 | 74.2 |

EXAMPLE 5

Quick lime (19.99 parts, containing 95.0% of CaO) is slaked in 240 parts of hot water at 95° C., and the mixture is stirred in a homomixer at a high speed for 5 minutes to prepare milk of lime having a sedimentation volume of 15.3 ml. Subsequently an aqueous suspension (concentration 4.76%) of ferrosilicon dust (containing 92.0% of SiO$_2$) 0.24 μm in average particle diameter is stirred in a homomixer at a high speed for 10 minutes to disperse the dust particles and obtain an aqueous slurry 1.0 μm in particle diameter at cumulative weight percent of 70%. The milk of lime is admixed with a portion of the aqueous slurry of the ferrosilicon dust (22.01 parts, calculated as solids), and the mixture is stirred with addition of water to obtain a starting slurry having a water to solids ratio by weight of 50:1. The starting slurry is subjected to hydrothermal reaction at saturated water vapor pressure of 12 kg/cm$^2$ at a temperature of 191° C. for 8 hours in the same autoclave as used in Example 1, with a stirrer driven at 112 r.p.m. to obtain a slurry of crystals. The slurry is dried at 110° C. for 24 hours and thereafter subjected to X-ray diffractiometry, which reveals that the crystals are xonotlite crystals. When observed under an optical microscope in the same manner as in Example 1, the slurry is found to contain globular secondary particles having an average outside diameter of 31 μm. An observation of the slurry by the reflection method reveals that the particles have distinct contours and substantially transparent interior. In the same manner as in Example 1, a shaped body is prepared from the slurry of crystals by spontaneous sedimentation. A portion of the body is fixed with a mixture of methyl methacrylate, ethyl methacrylate and n-butyl methacrylate resins and thereafter sliced with a super microtome. An observation of the slice under a scanning electron microscope reveals that the particles have a shell thickness of 0.1 to 7 μm, an average shell thickness of 2.25 μm and substantially hollow interior. An electron microscopic observation of the particles indicates that the shells have numerous burrs on the surface due to the presence of xonotlite crystals. A further observation of the secondary particle under a scanning electron microscope indicates that the particle has a hollow globular shell composed of a large number of xonotlite crystals interlocked with one another three-dimensionally. When observed under an electron microscope, the xonotlite crystals (primary crystals) forming the secondary particle are found to be needlelike crystals 1 to 20 μm in length and about 0.05 to 1.0 μm in width. These crystals, when baked at 1000° C. for 3 hours, give β-wollastonite crystals.

Table 13 below shows properties of the secondary particles.

TABLE 13

| Properties | Measurements |
| --- | --- |
| Average particle diameter (μm) | 31 |
| Range of outside diameters of 80% of the particles (μm) | 10–50 |
| Average apparent density (g/cm$^3$) | 0.073 |
| Average weight of particles (g) | 1.14 × 10$^{-9}$ |
| Thickness of shell (μm) | 0.1–7 |
| Average shell thickness (μm) | 2.25 |
| Average shell density (g/cm$^3$) | 0.194 |

In the same manner as in Example 1, the slurry of xonotlite crystals is made into a shaped body by spontaneous sedimentation. The body had a density of 0.043 g/cm$^3$. The slurry of crystals has an average spontaneous sedimentation height of 917 ml.

Specimens of shaped body are prepared from portions of the slurry prepared as above (each 88 parts, calculated as solids) by thoroughly admixing 4 parts of pulp, 5 parts of glass fiber and 3 parts of cement with each of the portions, press-shaping the mixture and drying the shaped mass as 120° C. for 20 hours (specimens I and II). Specimens III and IV are prepared in the same manner as above except that 20 parts of the same mixture of nonionic and anionic surfactants as used in Example 1 is incorporated into the slurry. Table 14 shows properties of the specimens.

TABLE 14

| Properties | Specimen No. I | II | III | IV |
| --- | --- | --- | --- | --- |
| Density (g/cm$^3$) | 0.056 | 0.080 | 0.050 | 0.075 |
| Bending strength (kg/cm$^2$) | 1.39 | 4.03 | 1.06 | 3.24 |
| Specific strength | 443.2 | 629.7 | 424.0 | 576.0 |
| Linear shrinkage on drying (%) | 2.41 | 0.33 | 0.48 | 0 |

The specimens, when baked at 850° C. for 3 hours, have the properties listed in Table 15 below.

TABLE 15

| Properties | Specimen No. I | II | III | IV |
| --- | --- | --- | --- | --- |
| Density (g/cm$^3$) | 0.053 | 0.078 | 0.048 | 0.072 |
| Bending strength (kg/cm$^2$) | 0.93 | 2.91 | 0.78 | 2.21 |
| Specific strength | 331.1 | 478.3 | 338.5 | 426.3 |
| Linear shrinkage after heating (%) | 0.57 | 0.24 | 0.45 | 0.31 |
| Residual specific strength | 74.7 | 76.0 | 79.8 | 74.0 |

EXAMPLE 6

Quick lime (19.99 parts, containing 95.0% of CaO) is slaked in 240 parts of hot water at 90° C., and the mixture is stirred in a homomixer at a high speed for 7 minutes to prepare milk of lime having a sedimentation volume of 20.0 ml. Subsequently an aqueous suspension (concentration 4.76%) of ferrosilicon dust (containing 92.0% of SiO$_2$) 0.24 μm in average particle diameter is stirred in a homomixer at a high speed for 10 minutes to disperse the dust particles and obtain an aqueous slurry 1.0 μm in particle diameter at cumulative weight percent of 70%. The milk of lime and 14 parts of the same mixture of nonionic and anionic surfactants as used in These crystals, when baked at 1000° C. for 3 hours, give β-wollastonite crystals.

Table 19 below shows properties of the secondary particles.

TABLE 19

| Properties | Measurements |
| --- | --- |
| Average particle diameter (μm) | 40 |
| Range of outside diameters of 80% of the particles (μm) | 20-50 |
| Average apparent density (g/cm³) | 0.10 |
| Average weight of particles (g) | $3.35 \times 10^{-9}$ |
| Thickness of shell (μm) | 0.5-6 |
| Average shell thickness (μm) | 2.60 |
| Average shell density (g/cm³) | 0.293 |

In the same manner as in Example 1, the slurry of xonotlite crystals is made into a shaped body by spontaneous sedimentation. The body had a density of 0.069 g/cm³. The slurry of crystals has an average spontaneous sedimentation height of 605 ml.

Specimens of shaped body are prepared from portions of the slurry prepared as above (each 88 parts, calculated as solids) by thoroughly admixing 4 parts of pulp, 5 parts of glass fiber and 3 parts of cement with each portion, press-shaping the mixture and drying the shaped mass at 120° C. for 20 hours (specimens I and II). Table 20 shows properties of the specimens.

TABLE 20

| Properties | Specimen No. I | Specimen No. II |
| --- | --- | --- |
| Density (g/cm³) | 0.076 | 0.080 |
| Bending strength (kg/cm²) | 1.82 | 2.35 |
| Specific strength | 315.1 | 367.2 |
| Linear shrinkage on drying (%) | 0.61 | 0.33 |

We claim:

1. Globular secondary particles of wollastonite group calcium silicate crystals represented by the formula $$lCaO.mSiO_2.nH_2O$$

wherein $1 \leq l \leq 6$, $1 \leq m \leq 6$ and $0 \leq n \leq 1$, characterized in that the particles consist essentially of hollow globular secondary particles of the wollastonite group calcium silicate crystals, the globular secondary particles having an average spontaneous sedimentation height of at least 800 ml, an outside diameter of 5 to 110 μm, an average apparent density of 0.04 to 0.09 g/cm³ and an average shell density defined by the equation $$Y = 0.0033X + B$$

wherein Y is the average shell density, X is the average diameter of the particles, B is a constant, $15 \mu m \leq X \leq 40 \mu m$ and $0 \leq B \leq 0.115$.

2. Globular secondary particles of calcium silicate as defined in claim 1 further consisting essentially of tobermorite group crystals admixed with the wollastonite group calcium silicate crystals in an amount of up to 100 parts by weight per 100 parts by weight of the wollastonite group calcium silicate crystals.

3. Globular secondary particles of calcium silicate as defined in claim 1 wherein the average spontaneous sedimentation height is at least 850 ml.

4. Globular secondary particles of calcium silicate as defined in claim 1 wherein the globular secondary particles of calcium silicate are about 0.1 to about 7.0 μm in the thickness of shell.

5. A slurry of calcium silicate crystals consisting essentially of the globular secondary particles of calcium silicate as defined in claim 1 and dispersed in water.

6. A slurry of calcium silicate crystals as defined in claim 5 in which contains the water is present in an amount of at least 15 times the weight of the solids in the slurry.

7. A slurry of calcium silicate crystals as defined in claim 5 wherein at least about 80% of the globular secondary particles are 10 to 50 μm in outside diameter.

8. A slurry of calcium silicate crystals as defined in claim 5 further consisting essentially of a reinforcing material.

9. A slurry of calcium silicate crystals as defined in claim 8 wherein the reinforcing material is a fibrous material.

10. A slurry of calcium silicate crystals as defined in claim 9 wherein the fibrous reinforcing material is in the form of inorganic fibers at least partly joined with the globular secondary particles of calcium silicate.

11. A slurry of calcium silicate crystals as defined in claim 5 further consisting essentially of a surfactant.

12. A shaped body of wollastonite group calcium silicate crystals represented by the formula $$lCaO.mSiO_2.nH_2O$$

wherein $1 \leq l \leq 6$, $1 \leq m \leq 6$, $0 \leq n \leq 1$, characterized in that the shaped body consists essentially of hollow globular secondary particles of crystals of wollastonite group calcium silicate, the globular secondary particles being joined with one another and having, before shaping, an average spontaneous sedimentation height of at least 800 ml, an outside diameter of 5 to 110 μm an average apparent density of 0.04 to 0.09 g/cm³ and an average shell density defined by the equation $$Y = 0.0033X + B$$

wherein Y is the average shell density, X is the average diameter of the particles, B is a constant, $15 \mu m \leq X \leq 40 \mu m$ and $0 \leq B \leq 0.115$.

13. A shaped body as defined in claim 12 further consisting essentially of a reinforcing material uniformly incorporated therein.

14. A shaped body as defined in claim 13 wherein the reinforcing material is a fibrous material.

15. A shaped body as defined in claim 12 further consisting essentially of a surfactant uniformly incorporated therein.

16. A process for producing the globular secondary particles of calcium silicate as defined in claim 1 characterized by the steps of dispersing siliceous particles up to 0.5 μm in average diameter with 70% by weight of said particles being up to 2 μm in diameter to prepare a first slurry, admixing the first slurry with milk of lime to form a starting slurry, subjecting the starting slurry to hydrothermal reaction with continuous or temporarily interrupted stirring to prepare an active slurry of calcium silicate crystals, and drying the active slurry, the milk of lime having a sedimentation volume of at least 5 ml, the starting slurry containing water in an amount at least 30 times the weight of the solids of the starting slurry.

17. A process as defined in claim 16 wherein the fine siliceous particles are silicon dust and/or fine particle reinforcing silica.

18. A process as defined in claim 16 wherein the milk of lime has a sedimentation volume of at least 8 ml.

19. A process for producing the active slurry of calcium crystals as defined in claim 5 characterized by the steps of dispersing siliceous particles up to 0.5 μm in average diameter with 70% by weight of said particles being up to 2 μm in diameter to prepare a first slurry admixing the first slurry with milk of lime to form a starting slurry, subjecting the starting slurry to hydrothermal reaction with application of pressure and heat and with continuous or temporarily interrupted stirring, the milk of lime. having a sedimentation volume of at least 5 ml, the starting slurry containing water in an amount at least 30 times the weight of the solids of the starting slurry.

20. A process as defined in claim 19 wherein the starting slurry further incorporates an inorganic reinforcing material.

21. A process as defined in claim 19 wherein the starting slurry further incorporates a surfactant.

22. A process for producing a shaped body of calcium silicate characterized by shaping the slurry of calcium silicate crystals as defined in claim 5 and drying the shaped mass.

23. A process as defined in claim 22 wherein the slurry incorporates a surfactant.

24. A process as defined in claim 22 wherein the slurry incorporates a reinforcing material.

25. A process as defined in claim 22 wherein the shaped body is baked to convert the xonotlite forming the shaped body to β-wollastonite.

* * * * *